(12) United States Patent
Bass et al.

(10) Patent No.: US 6,814,146 B2
(45) Date of Patent: Nov. 9, 2004

(54) ANNULUS FOR ELECTRICALLY HEATED PIPE-IN-PIPE SUBSEA PIPELINE

(75) Inventors: Ronald Marshall Bass, Houston, TX (US); Byron Lee Newberry, Edmond, OK (US); Carl Gottlieb Langner, Spring, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/910,696

(22) Filed: Jul. 20, 2001

(65) Prior Publication Data

US 2004/0060693 A1 Apr. 1, 2004

(51) Int. Cl.[7] .............................................. E21B 43/01
(52) U.S. Cl. ..................... 166/302; 166/241.4; 405/169
(58) Field of Search ................. 166/302, 369, 166/372, 57, 62, 65.1, 241.4, 176, 341; 405/169, 170, 173, 154

(56) References Cited

U.S. PATENT DOCUMENTS

| | | |
|---|---|---|
| 972,308 A | 10/1910 | Williamson |
| 1,231,202 A | 6/1917 | Saylor |
| 2,096,279 A | 10/1937 | Karcher ........................ 255/28 |
| 2,178,720 A | 11/1939 | Daniels ........................ 219/47 |
| 2,206,831 A | 7/1940 | Berthelsen .................... 74/440 |
| 2,217,857 A | 10/1940 | Byck ............................. 166/21 |
| 2,224,403 A | 12/1940 | Lines ........................... 219/39 |
| 2,306,831 A | 12/1942 | Proctor ........................ 219/39 |
| 2,660,249 A | 11/1953 | Jakosky ....................... 166/17 |
| 3,439,075 A | 4/1969 | Bauer et al. .................. 264/45 |
| 3,507,330 A | 4/1970 | Gill ............................. 166/248 |
| 3,515,837 A | 6/1970 | Ando ....................... 219/10.49 |
| 3,547,193 A | 12/1970 | Gill ............................. 166/248 |
| 3,556,218 A | 1/1971 | Talley, Jr. et al. ........... 166/265 |
| 3,605,888 A | 9/1971 | Crowson et al. ............. 166/248 |
| 3,614,986 A | 10/1971 | Gill ............................. 166/303 |
| 3,620,300 A | 11/1971 | Crowson ..................... 166/248 |
| 3,630,038 A | 12/1971 | Ando ........................... 61/72.1 |
| 3,642,066 A | 2/1972 | Gill ............................. 166/248 |
| 3,706,872 A | 12/1972 | Trabilcy ...................... 219/300 |

(List continued on next page.)

FOREIGN PATENT DOCUMENTS

| | | | |
|---|---|---|---|
| EP | 1070907 | 1/2001 | ........... F16L/59/14 |
| GB | 2084284 | 7/1982 | ........... F16L/53/00 |
| SU | 569815 | 9/1977 | |
| WO | 103122 | 4/1937 | |
| WO | 1359445 | 3/1972 | ........... F16L/25/00 |
| WO | 1437587 | 7/1974 | ........... F16L/13/10 |
| WO | 1532730 | 10/1976 | ........... F16L/25/01 |

OTHER PUBLICATIONS

"Cable–Free Electrical Systems for the Oil to Gas Industry," Production Technologies Company, L.L.C., 600 Kenrick, Suite C–30; Houston, Texas 77060, advertisement, Copyright 1996, 6 pp.

(List continued on next page.)

Primary Examiner—Frank Tsay

(57) ABSTRACT

Apparatus and method for electrically heating a segment of a subsea pipeline are provided. The annulus between the pipes electrically isolates the pipes, but at the ends of the segment the concentric pipes are electrically connected. The inner pipe may be thermally insulated. Electrically insulating water stops are provided to act as flood control barriers in the event the outer pipe is breached. Collars on seals around the water stops may help avoid electrical shorts and packets of super-absorbent may be in place to further reduce the risk of electrical faults.

32 Claims, 3 Drawing Sheets

U.S. PATENT DOCUMENTS

| | | | |
|---|---|---|---|
| 3,789,188 A | 1/1974 | Rudberg | 219/301 |
| 3,859,503 A | 1/1975 | Palone | 219/278 |
| 3,885,595 A | 5/1975 | Gibson et al. | 138/155 |
| 3,933,031 A | 1/1976 | Uhlarik | 73/40.5 R |
| 3,935,632 A | 2/1976 | Maxson | 29/455 R |
| 3,944,262 A | 3/1976 | Stiner et al. | 285/53 |
| 3,958,636 A | 5/1976 | Perkins | 166/248 |
| 3,975,617 A | 8/1976 | Othmer | 219/300 |
| 3,981,181 A | 9/1976 | Ochiai | 73/40.5 R |
| 3,983,360 A | 9/1976 | Offermann | 219/301 |
| 4,010,799 A | 3/1977 | Kern et al. | 166/248 |
| 4,011,652 A | 3/1977 | Black | 29/455 R |
| 4,017,102 A | 4/1977 | Henderson | 285/41 |
| 4,140,179 A | 2/1979 | Kasevich et al. | 166/248 |
| 4,142,093 A | 2/1979 | Offermann | 219/301 |
| 4,319,632 A | 3/1982 | Marr, Jr. | 166/60 |
| 4,401,162 A | 8/1983 | Osborne | 166/248 |
| 4,450,711 A | 5/1984 | Claude | 73/40.5 R |
| 4,496,174 A | 1/1985 | McDonald et al. | 285/53 |
| 4,522,578 A | 6/1985 | Martin, Jr. et al. | 425/110 |
| 4,553,023 A | 11/1985 | Jameson et al. | 219/301 |
| 4,590,971 A | 5/1986 | Webster et al. | 138/149 |
| 4,644,780 A | 2/1987 | Jeter | 73/40.5 |
| 4,645,906 A | 2/1987 | Yagnik et al. | 219/301 |
| 4,667,505 A | 5/1987 | Sharp | 73/40.5 R |
| 4,684,786 A | 8/1987 | Mann et al. | 219/297 |
| 4,716,960 A | 1/1988 | Eastlund et al. | 166/60 |
| 4,768,455 A | 9/1988 | Maxson et al. | 114/264 |
| 4,831,324 A | 5/1989 | Asakura et al. | 324/57 R |
| 4,839,644 A | 6/1989 | Safinya et al. | 340/854 |
| 4,861,074 A | 8/1989 | Eastlund et al. | 285/53 |
| 4,874,925 A | 10/1989 | Dickenson | 249/301 |
| 4,970,467 A | 11/1990 | Burnett | 324/637 |
| 4,992,001 A | 2/1991 | Harrison | 405/166 |
| 4,996,879 A | 3/1991 | Kruka et al. | 73/592 |
| 5,072,622 A | 12/1991 | Roach et al. | 73/40.5 R |
| 5,172,730 A | 12/1992 | Driver | 138/104 |
| 5,189,374 A | 2/1993 | Burnett | 324/534 |
| 5,270,661 A | 12/1993 | Burnett | 324/527 |
| 5,289,561 A | 2/1994 | Costa Filho | 392/478 |
| 5,421,675 A | 6/1995 | Brown et al. | 405/170 |
| 5,464,307 A | 11/1995 | Wilkins | 405/166 |
| 5,490,562 A | 2/1996 | Arnold | 166/267 |
| 5,566,754 A * | 10/1996 | Stokka | 166/241.6 |
| 5,605,798 A | 2/1997 | Koster | 435/6 |
| 5,801,953 A | 9/1998 | Thoma et al. | 364/487 |
| 5,836,719 A | 11/1998 | Martin et al. | 405/166 |
| 5,905,194 A | 5/1999 | Strong | 73/40.5 |
| 5,908,072 A * | 6/1999 | Hawkins | 166/241.6 |
| 6,000,438 A | 12/1999 | Ohrn | 138/149 |
| 6,049,657 A | 4/2000 | Sumner | 392/469 |
| 6,058,979 A | 5/2000 | Watkins | 138/149 |
| 6,114,857 A | 9/2000 | Kohl | 324/534 |
| 6,142,707 A | 11/2000 | Bass et al. | 405/158 |
| 6,179,523 B1 | 1/2001 | Langner et al. | 405/169 |
| 6,264,401 B1 * | 7/2001 | Langner et al. | 405/169 |
| 6,278,095 B1 | 8/2001 | Bass et al. | 219/629 |
| 6,292,627 B1 | 9/2001 | Gilchrist, Jr. et al. | 392/311 |
| 6,305,429 B1 | 10/2001 | Welch et al. | 138/149 |
| 6,315,497 B1 | 11/2001 | Wittman et al. | 405/158 |
| 6,364,401 B1 | 4/2002 | Kim | 296/194 |
| 6,371,693 B1 | 4/2002 | Kopp et al. | 405/158 |
| 6,382,259 B1 | 5/2002 | Codling | 138/149 |
| 6,509,557 B1 | 1/2003 | Bass | 219/772 |
| 2003/0015436 A1 | 1/2003 | Bass et al. | 205/740 |
| 2003/0015519 A1 | 1/2003 | Stone, Jr. | 219/494 |
| 2003/0016028 A1 | 1/2003 | Bass | 324/642 |
| 2003/0017007 A1 | 1/2003 | Bass et al. | 405/154.1 |
| 2003/0020499 A1 | 1/2003 | Bass | 324/721 |

OTHER PUBLICATIONS

"Dunbar in Depth," Offshore Engineer, Dec. 1994, 2 pp.

"Introduction to Direct Heating of Subsea Pipelines," overview byStatoil, Saga Petroleum, CSO Norge, Alcatel, Kabel Nore and EFI, Feb. 1988.

"Monolithic Pipeline Electrical Isolation Joints," Hydro-Tech Systems, Inc., Engineered Pipeline Products, advertisement, Nov. 1996, 6 pp.

"New Double Pipe Insulated System (DPIS) Designed by Snamprogetti", Snamprogetti Offshore Division, Viale del Gasperi 16, San Donato Milanese, Milan, Italy, advetisement, 6 pp.

"Skin Effect Pipe Heating Systems," Thermo Systems Technology, Inc. (TST), Four Commerce Park Square, 23200 Chagrin Boulevard, Suite 600, Beachwood, Ohio 44122, Copyright 1991, advertisement, 4 pp.

Stop Paraffin Build–up and Realize Your Well's Full Potential . . . Plug in Paratrol, International, Inc. (PTI), 15423 Vantage Parkway East, Houston, Texas 77032, advertisement, Copyright 1989, 6 pp.

"Tubing Casing Wireless Telemetry (Tucas System)," Schlumberger web page (1993?/ Jun. 1996), 16 pp.

A. Anselmi et al., "TTDPIS: A New Underwater Technology in the Field of Traced Insulated Piplines," 1994 OMAE, vol. 5, Pipeline Technology, ASME, 1994, pp. 69–76.

Anonymous, Insulated Pipe—Precision Engineering, Jun. 2000, The Bayou Bulletin, Issue ™8 from www.bayoupip.com/4News/Newslwtter0 8–4.thm, 2 pages.

Anonymous, "Insulated Technique to see first use in North Sea Development", May 17, 1993, Oil and Gas Journal vol. 91, Issue 20, page 61.

B. J. Eastlund et al., "New System Stops Paraffin Buildup," Petroleum Engineer, Jan. 1989, 3 pp.

Brochure –Combi Pipe –the end of clogged pipelines, Alcatel Contracting Norway and Aker Engieering, 7 pp.

Brochure –World Wide Experience List –Compressed Gas Insulated Transmission Bus System Type CGIT, ABB Power T & D Company Inc., 30 Oak Street,Westborough, MA 01581, USA, 6 pp.

C. G. Langer, "Engineering Report—1979 Construction of the Cognac 12–inch Pipeline From Mississippi Canyon Block 194 to Southwest Pass East Bay Central Facilities, Offshore Louisiana,"ES No. 74–82, Job No. 560513, Shell Oil Company, Pipeline Construction Department, *, 6 pp.

Compressed Gas Insulation Transmission Bus Ducts, ABB Power T&D Company, CGIT/PB Division, Westborough, MA, US 22 pages.

DeLuca, "Field of Dreams", Apr. 1, 2001, Offshore Engineering, form www.online.com/news/features/oe/2001 0401.Fields_0.520.asp, 9 pages.

F. Aarseth and E. Bentsen, "Heating of Pipelines, and Power Supply to Subsea Electrical Equipment," Aker Engineering a.s. A. Bjømstad and B. Knutsen, Alcatel Contracting Norway a.s., DOT 1995, 23 pp.

F. R. Newbold and T. K. Perkins, "Wellbore Transmission of Electrical Power,", The Journal of Canadian Petroleum Technology, Jul.–Sep. 1978, Montreal, pp. 3–52.

pg,11

F.G. Bosch, K. H. Schmitt, and B. J. Eastlund, "Evaluation of Downhole Electric Impedance Heating systems for Paraffin Control," Paper No. PCIC–90–34 presented at Industry Applications Society 37th Annual Petroleum and Chemical Industry Conference, Houston, Texas, Sep. 10–12, pp. 223–227.

Fred, S. Epstein and Gary L. White, "Understanding Impedance Heating," Chemical Engineering, May 1996, pp. 112–118.

Gaylord, N.G., Gaylord Associates, Newark, New Jersey, "Polymers –Part I. Polyalklene Oxides and Other Polyethers"; Interscience Publishers: New York–London–Sydney, pp. 9–80.

"General Product Specification—Pipeline Insulating Joint," HydroTech Systems, Engineered Pipeline Products, advertisement, pp.

H. Collins and M.A.R. Lyle, Progress Reported in Design of Reelable Insulated Subsea Flow Lines, Oil and Gas Journal, Sep. 24, 1990, p. 102–106.

K. H. Akfhampour, "A Novel Approach to Solving Downhole Fluid Flow Problems by Use of an Electric Heating System", Paper No. PCIC–85–35, 12 pp.

Krevelen, D. W., Univ. of Technology. Delft. The Netherlands, "Properties of Polymers", 3.sup.rd Edition (Revised), Elsevier; Amsterdam–Oxford–New York–Tokyo, 1990; pp. 641–653.

M.I. Mollison, "Foam Insulation Gets First Reeled Instalation off Australia," Oil and Gas Journal, May 18, 1992, pp. 80–82.

Monobloc Insulating Joints Type "IK".

N. B. Carson, "A New Method for Heat Tracing Long Pipelines," ASME, 74–Pet–35, paper presented at the Petroleum Mechanical Engineering Conference, Dallas, Texas, Sep. 15–18, 1974, pp. 2–4.

Protest Document, Dec. 8, 1987 letter of Andrew W. Marr, Jr. to the Assistant Commissioner of Patents requesting issuance of U.S. patent 4,716,960 available in the file history as of Jan. 5, 1988.

R. Walsh, "Electromagnetic Energy Helps Recovery," Gulf Coast Oil World,, Jun. 1986, pp. 18–19.

"Taking Induction Heating Underwater," Process Heating, Jul./Aug. 1995, 1 p.

The Electrothermic Co. (TEC), 4916 Bear Lane, P.O. Box 4227, Corpus Christi,.TX 78408 advertisement/sales brochure, 4 pp.

Anecdote—"Thermo Systems Under River Crossings" discussed in Supplemental Information Disclosure Statement filed on Jun. 22, 2000 for US patent application SN 08/921,737, filed Aug. 27, 1997, entitled, "Method for Maintaining Well Fluids Within a Shut–In Subsea Pipeline."

Anecdote—"Fuel Oil Between Buildings" discussed in Supplemental Information Disclosure Statement filed on June 22, 2000 for US patent application SN 08/921,737, filed Aug. 27, 1997, entitled, "Method for Maintaining Well Fluids Within a Shut–In Subsea Pipeline."

Anecdote—"Asphalt Transfer Liner from Tank Cars et al." discussed in Supplemental Information Disclosure Statement filed on Jun. 22, 2000 for US patent application SN 08/921,737, filed Aug. 27, 1997, entitled, "Method for Maintaining Well Fluids Within a Shut–In Subsea Pipeline."

Production Technologies Company Invention Discosure of R. M. Bass dated Jul. 24, 1986, "Disclosure for Controlled Parafin Deposition in Subsea Pipelines" as discussed in Supplemental Information Disclosure Statement filed on Jun. 22, 2000 for US patent application S/N No. 08/921,737, filed Aug. 27, 1997, entitled "Method for Maintinaing Well Fluids Within a Shut–In Subsea Pipeline."

Purported Invention Disclosure of Production Technologies Company, L.L.C. (PTC) by Bernard J. Eastlund and John Haeber, dated Apr. 28, 1995. Apparatus for Introducing Electric Current into and Offshore Pipeline 4pp as discussed in Supplemental Information Disclosure Statement filed on Jun. 22, 2000 for US patent application S/N No. 08/921,737, filed Aug. 27, 1997, entitled "Method for Maintinaing Well Fluids Within a Shut–In Subsea Pipeline."

* cited by examiner

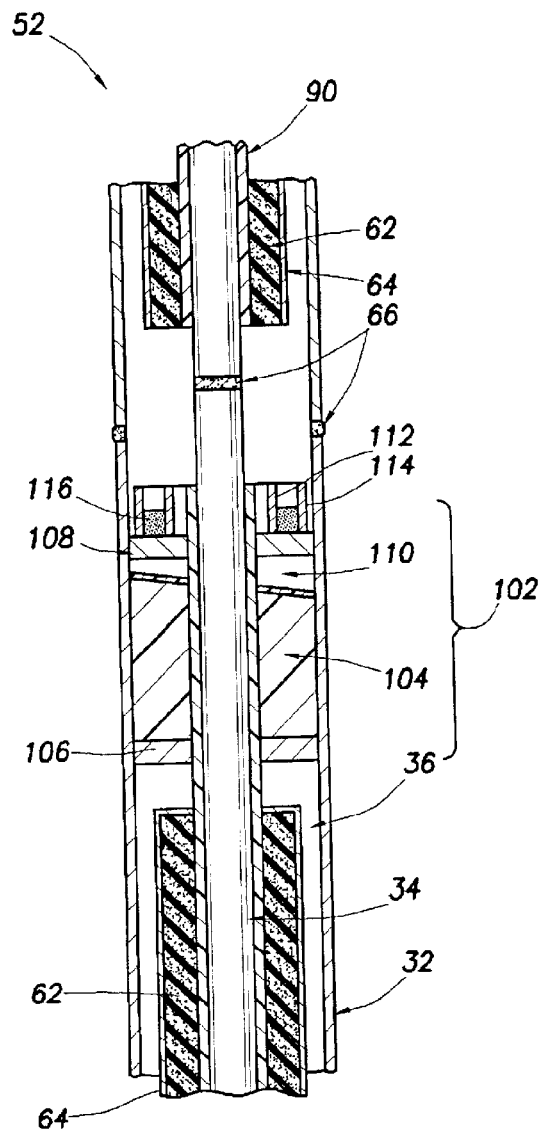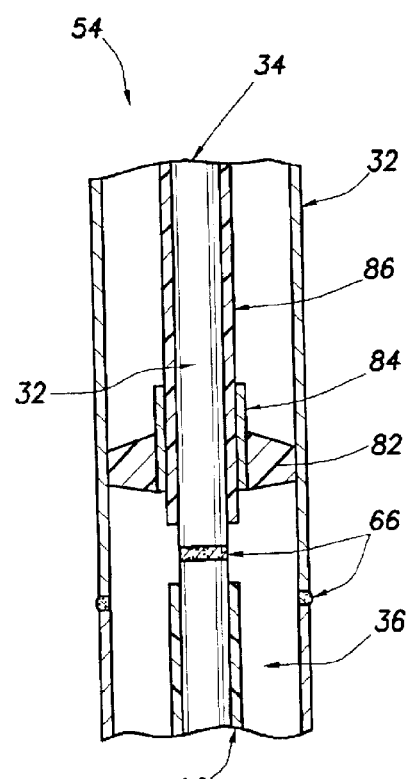
FIG.3
FIG.4

ANNULUS FOR ELECTRICALLY HEATED PIPE-IN-PIPE SUBSEA PIPELINE

BACKGROUND OF THE INVENTION

1. Field of the Invention

The present invention relates to electrical heating of subsea pipelines. More particularly the invention relates to electrical heating with a pipe-in-pipe configuration.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep, where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressurizing the flow line to remove a hydrate plug may not be effective. Higher pressures in the line and uneven sea floor topography require excessive time and may create operational problems and be costly in terms of lost production.

The problem of lower temperatures in pipelines has been addressed by a variety of heating methods, including electrical heating. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999). One electrical heating method is the pipe-in-pipe method. In one configuration of a pipeline using this method, a pipe-in-pipe subsea pipeline is provided by which a flow line for transporting well fluids is surrounded concentrically by and electrically insulated from an electrically conductive outer pipe until the two pipes are electrically connected at the distal or remote end of a heated segment by a bulkhead. Voltage is applied between the inner and outer pipes at the proximate or electrical input end and electrical current flows along the exterior surface of the inner pipe and along the interior surface of the outer pipe. This pipe-in-pipe method of heating is disclosed, for example, in U.S. Pat. No. 6,142,707. Other variations of the general pipe-in-pipe method exist. The electrical power is supplied through an electrical isolating joint at the power input end of a segment of line to be heated. Alternating current, normally at about 60 Hz, is used. The voltage across the annulus is highest at the isolating joint and falls linearly to zero at the bulkhead. The current is essentially constant along the entire length of the pipe segment that is heated. Two key electrical effects, the skin effect and the proximity effect, confine the current flow largely to the annulus surfaces. Consequently, most of the current is effectively isolated from the produced fluids and the seawater around the pipeline.

In pipe-in-pipe electric heating configurations, an annulus design that electrically isolates the inner and outer pipe and provides thermal insulation and load sharing is desirable. Electrical isolation between the inner and outer pipe is needed so that the pipes will not shortout, or develop an electrical fault. Thermal insulation is advantageous because it minimizes heat loss from the inner pipe and reduces the amount of electrical current necessary to achieve the desired temperature in the inner pipe. Load sharing between the pipes helps limit the stress on the outer pipe during laying.

An annulus design that prevents complete flooding of the annulus and confines flooding caused by a breach of the outer pipe to a subsection of the annulus is needed. There is also a need for an annulus design that allows for the removal of small amounts of water that may be present in the annulus.

SUMMARY OF THE INVENTION

Towards providing these and other advantages, the present invention provides an annulus for a pipe-in-pipe electrically heated pipeline having an electrically and thermally insulating sleeve over the inner pipe in selected segments of the annulus, with a gap between the sleeve and the outer pipe. The sleeve is preferably made of polyurethane foam with an impermeable plastic skin on the outside surface. The inside pipe may be coated with fusion bonded epoxy. The weld joints in the inside pipe may be covered with half-shells, also made of foam. In parts of the annulus where greater thermal insulation is needed, more of the annulus contains the insulating sleeve. If no thermal insulation is needed, the insulating sleeve may be omitted and insulating pipe centralizers be used.

The annulus may also include water stops. A water stop includes a solid polyurethane plug that is formed from liquid polymer placed in the annulus over a seal. A second seal is present on top of the plug. The seals are preferably made of rubber having the proper hardness. Both seals may have one or more collars on top of the seal, so that water can collect around or between the collars without causing an electrical short in the annulus. A highly water-absorbent material may also be placed on top of the seal. When the plug is formed with the annulus not in an upright position, the top surface of the plug is not perpendicular to the pipe axis and an angle-correcting piece is provided between the plug and the top seal. Seals or water stops may be used in segments of the pipeline regardless of whether thermal insulation is needed. Seals may be used regardless of whether a plug is used, as the seals alone can confine movement of water in the annulus if there is not a breach of the line. Less thermal insulation may be used in the riser, particular in the upper or shallower water parts of the riser.

DESCRIPTION OF THE DRAWINGS

For a more complete understanding of the invention and the advantages thereof, reference is now made to the following description taken in conjunction with the following drawings in which like reference numbers indicate features and wherein:

FIG. 3 is a cross sectional sketch of a pipe-in-pipe configuration for direct heating of a pipeline, like that shown in FIG. 1, showing the components that reside in the annulus in a deeper water segments of the pipeline.

FIG. 4 is a cross sectional sketch of a pipe-in-pipe configuration for direct heating of a pipeline, like that shown in FIG. 1, showing the components that reside in the annulus in a shallower water segments of the pipeline.

DETAILED DESCRIPTION

U.S. Pat. No. 6,142,707 and patent applications filed concurrently herewith and titled "Method of Installation of Electrically Heated Pipe-in-Pipe Subsea Pipeline" (Ser. No. 09/910,678 and "Corrosion Protection of Electrically Heated Pipe-in-Pipe Subsea Pipeline," (Ser. No. 091910,489), all commonly owned, are incorporated herein by reference.

Figure 1:
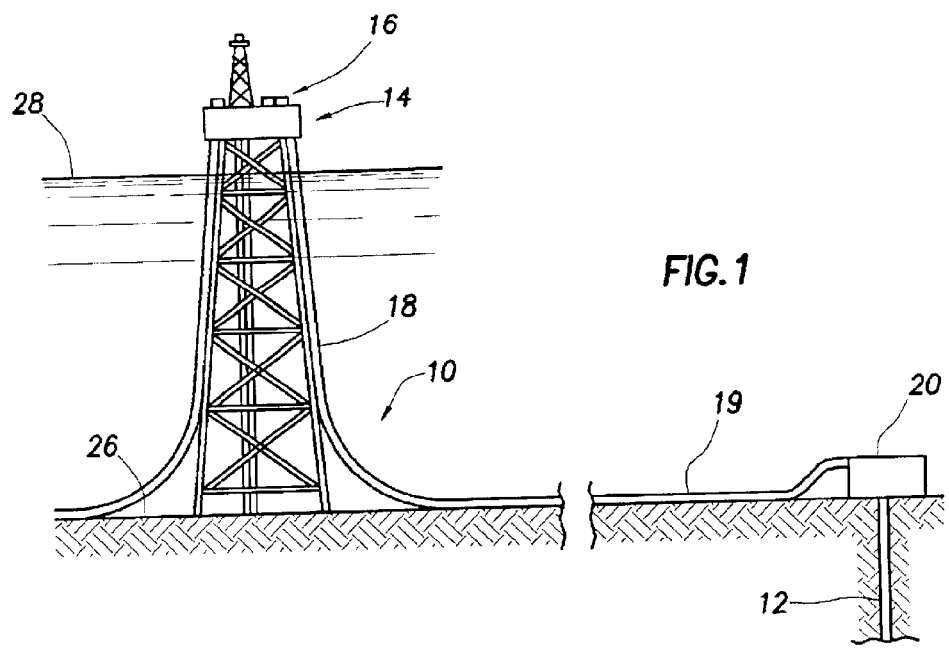
FIG. 1 is a view of a platform and a satellite subsea well connected by subsea pipeline.

FIG. 1 illustrates the environment of the present invention. Here remote satellite well 12 is connected to platform 14 with subsea pipe-in-pipe pipeline 10. Subsea pipeline 10 may consist of seafloor section 19 and riser section 18. Surface facilities 16 on platform 14 include an electrical power supply. Seafloor section 19 may be up to 20 or more miles long. Pipe-in-pipe flowline 10 may be composed of 40-ft joints of pipe welded together. It is common to form individual 160 ft segments of pipe, called quads (four joints), which are then welded together as they are placed subsea to form pipe-in-pipe flowline 10. Seafloor section 19, which may be a half-mile or more below surface 28 of the ocean, terminates at sled 20.

Figure 2:
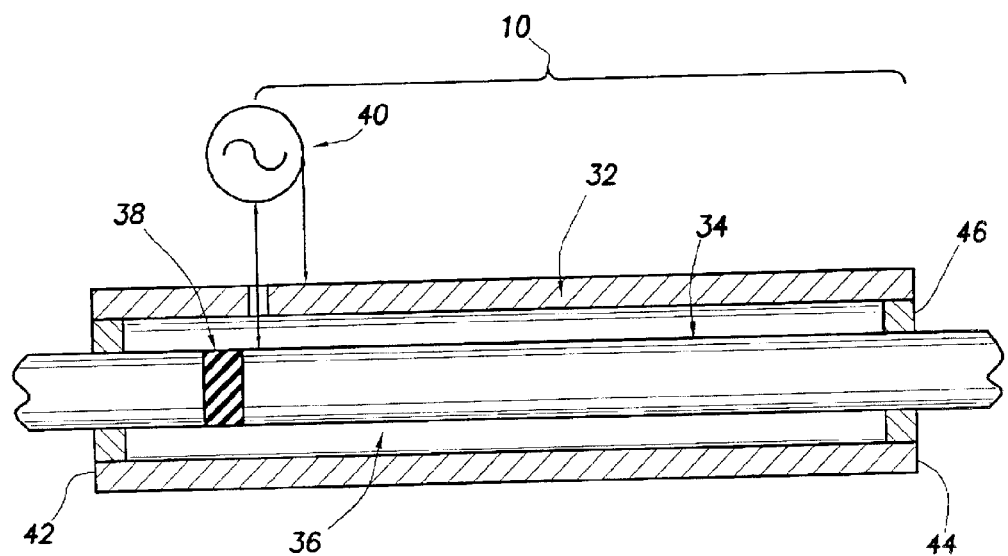
FIG. 2 is a cross sectional sketch of a pipe-in-pipe configuration for direct heating of a pipeline.

FIG. 2 illustrates one embodiment of an electrically heated pipe-in-pipe pipeline. In the embodiment shown in FIG. 2, pipeline 10 includes electrically conductive outer pipe 32 and electrically conductive product flowline or inner pipe 34 arranged concentrically. Annulus 36 is defined between inner pipe 34 and outer pipe 32. Insulating joint 38, which is normally in proximity to platform 14, structurally joins and electrically insulates inner pipe 34 from outer pipe 32. Electrical power supply 40 is connected across inner pipe 34 and outer pipe 32. Thus pipe-in-pipe flowline 10 serves as a power transmission line, with the circuit completed by an electrical pathway connecting inner pipe 34 and Outer pipe 32 at a second end 44 of the pipeline, which is normally in proximity to sled 20. By transmitting power, the entire heated segment of pipeline 10 serves as an electrical heater. The connection for joining the inner and outer pipes is provided by electrically conductive bulkhead 46. In another embodiment, electrical power is input at an intermediate point, which may be near the midpoint of pipeline 10, with electrical pathways completing the circuit on both ends of pipeline 10.

To prevent electrical shorts across annulus 36, inner pipe 34 must be electrically isolated from outer pipe 32 along the entire length of heated segment 10 except at bulkhead 46. inner 34 may be thermally insulated to minimize heat loss and to reduce the amount of electrical power necessary to heat the contents of the pipe. Since electrical current flow is the same over the length of pipeline 10 and water temperature decreases with increasing water depth, the preferred amount of thermal insulation in different portions of riser 18 may vary. This may lead to the need for different annulus designs in different portions of pipeline 10. A design having less thermal insulation may be desirable for at least a portion of riser 18.

FIG. 3 shows, generally, apparatus 52 for use in an annulus where greater thermal insulative properties are needed. The outer surface of inner pipe 34 may be provided with electrically insulating coating 90, which may be fusion bonded epoxy. Such coating, when applied with an appropriate thickness, such as 20 thousandths of an inch or more, can withstand up to 8000 volts before failing, even after being wetted for several days. Electrically insulating coating 90 may have gaps around weld locations 66, where it is destroyed during welding.

Inner pipe 34 is further thermally and electrically insulated by insulating ring 62, which surrounds inner pipe 34 and coating 90 and extends a selected distance along the length of inner pipe 34. Insulating sleeve 62 is preferably made of a thermally and electrically insulative material such as polyurethane foam. Insulating sleeve 62 also serves to centralize inner pipe 34 within outer pipe 32, and may be formed by spraying on of an insulating foam material around inner pipe 34. Insulating sleeve 62 may also have solid skin 64 on its outer surface that serves to protect insulating sleeve 62 from mechanical damage during installation. Solid skin 64 may be used to provide a water barrier that protects insulating sleeve 62 if insulating sleeve 62 is porous and to provide an additional layer of electrical insulation. Examples of the material of solid skin 64 are polyurethane and polyethylene. A small clearance between solid skin 64 and outer pipe 32 reduces heat loss from inner pipe 32 by decreasing convection in annulus 36. Minimizing the clearance between solid skin 64 and the inner surface of outer pipe 32 is preferably less than about 0.25 inch.

Water stops may be needed in pipe-in-pipe flowline segment 10 to prevent complete water flooding of annulus 36 in the event of a breach in outer pipe 32 or failure of other equipment in the system. Even partial flooding of annulus 36 may cause an electrical short and prevent its further use. The effort required to remove water from the annulus and restore the pipeline to service can be reduced by separating the annulus into water-tight compartments. Electrically insulating water-proof barriers capable of withstanding the water pressure outside the pipeline across the barrier are needed. As shown in FIG. 3, water stop 102 may be used as a part of apparatus 52. Water stops may be used in every quad or less frequently. For instance, water stops such as stop 102 may be used every third quad (480 feet apart) in pipeline 10, both in seafloor section 19 and in riser 18 to reduce the risk of catastrophic flooding.

Water stops such as stop 102 fill annulus 36 for a selected longitudinal distance. Water stop 102 consists primarily of plug 104 which is contiguous with the outer surface of inner pipe 34 and the inner surface of outer pipe 32. Impermeable seals 106 and 108 may be placed in contact with the face of each end of plug 104. All the components of water stop 102 should be made of electrically insulating materials or otherwise electrically insulated.

In order to reduce the mechanical stress on either inner pipe 34 or outer pipe 32 during pipe laying (placing the pipe on the seafloor), mechanical stress is preferably transferred between pipes. This load sharing may be provided by plug 104. Because plug 104 is selected to fill the annulus and adhere to the surfaces of both the outer wall of inner pipe 34 and the inner wall of outer pipe 32, it provides the necessary load-sharing.

Exposed metal surfaces of pipes in contact with plug 104 are preferably cleaned or sanded so as to form an adherent surface. The material of plug may be polyurethane. The plug may be formed from a liquid that is placed in the annulus as the pipeline is being laid. Flowmax 6000, sold by Flowtech Corp. of Houston, Tex. is one such polyurethane that functions in this application. Plug 104 then provides mechanical support for adjacent impermeable seals 106 and 108. If outer pipe 32 were breached on either side of water stop 102, sea water would push against one of the impermeable seals 106 and 108. Impermeable seal 106 or 108 would in turn push against plug 104, which is mechanically held in place by its attachment to the piping walls or by ridges that may be provided on the pipe wall. The seals are energized by pushing against the plug under pressure. Plugs may be of any reasonable length, for example, between 1.5 and 3 feet. The preferred length of plug 104 depends on the outside water pressure at the operating depth of the pipeline. The higher the external pressure, the more support that impermeable seals 106 and 108 will require in case of a breach of outer pipe 32 or other failure. Plug 104 may also perform as a thermal insulator.

Because plug 104 should adhere to the outer surface of inner pipe 34, insulating sleeve 62 and solid skin 64 are removed from inner pipe 34 along the length of plug 104. Removal of sleeve 62 should be minimized to maximize thermal and electrical integrity. For example, in the embodiment shown in FIG. 3, which is designed to operate at sea water pressures near 1500 psi, 5 feet of insulating sleeve 62 are removed to accommodate a 2-ft plug. During installation, care should be taken to avoid contamination by lubricants or other substances of pipe surfaces that will be in contact with plug 104. These substances may prevent plug 104 from properly adhering to pipe surfaces.

Where plug 104 is made of polyurethane, the adhesion of plug 104 to pipe surfaces may be improved by the presence of an adherent coating, such as a fusion bonded epoxy, on pipe surfaces that will be in contact with plug 104. Improved bonding may result during plug 104 installation with fusion bonded epoxy on pipe surfaces because the epoxy may chemically react with polyurethane during cure of the polyurethane.

Seals 106 and 108, placed against the ends of plug 104, may be sized such that they form a tight fit in annulus 36. To yield a tight fit, seals 106 and 108 may be slightly larger, for instance, 1.5 to 2% larger, than the maximum width of annulus 36. Seals 106 and 108 may be made of rubber. Rubbers with a durometer of 40 to 65 are preferred as a material of construction. In addition, a rubber which is not susceptible to charring is preferred so that electrical arcs will not char the seal and self-propagate. Silicone-based rubbers are suitable. In one embodiment, second seal 108 is formed using a poured-in-place elastomer. An acceptable material is SYLGARD, a product of Dow Corning. In a preferred embodiment, rubber seals with no parting lines (from a mold) on seal surfaces are used. Silicone grease or similar materials may also be applied to the surface of inner pipe 34 where impermeable seals 106 and 108 are installed, to prevent the seals from rolling during installation.

The geometry of the seals is designed to facilitate installation without rolling or abrading while maintaining functionality. The cross-section of a seal has square corners and straight sides that extend about 15–30% of the dimensions in the radial and longitudinal direction. The inner/outer surface curves inward with a first radius to a central seal web. The width of the central seal web is nominally set at between 50% and 75% of the width of the minimum annular gap. The upper/lower surface may have a larger radius. The inner and outer diameters of the seal are set to provide seal integrity for maximum pipe annular distance. Tolerances in the nominal pipe diameter, wall thickness, and variations in ovality are considered. The exact width is experimentally determined during installation testing, to account for influences from the seal material and the pipe surface conditions. The radii on the upper and lower component surfaces are designed with a shallow cup to provide pressure actuation by forcing the seal faces outward against the pipe walls during axial compression by seawater at seafloor pressure that has leaked in due to a breach in the outer pipe. If required, relief cuts may be provided for the upper/lower and inner/outer surfaces. The upper/lower relief cuts facilitate radial compression of the seal during installation and provide enhanced pressure actuation under leakage conditions. The inner/outer side surface relief cuts are used to facilitate radial compression during installation.

Depending on the method of pipe laying employed, the upper surface of plug 104 may not be perpendicular to the axes of the pipes. This results when plug 104 is poured into the annulus as a liquid and cures with the axis of the pipes not in a vertical direction. This is a common orientation in pipe-laying operations. If the upper surface of plug 104 is not perpendicular to the axis of pipes 32 and 34, seal 108 may fail. This problem may be ameliorated by placing solid angle-correcting piece 110 over plug 104. Solid angle-correcting piece 110 should be constructed of an electrically insulating material that resists arcing along its surface. DELRIN or NYLON (which may be between two pieces of DELRIN) are two such suitable materials. The lower, angled surface of correcting piece 110 should fit over the angled upper surface of plug 104 such that the upper surface of correcting piece 110 forms a surface perpendicular to the axis of pipes 32 and 34. This method may require that correcting piece 110 be custom manufactured with the appropriate angle on its lower surface. This angle will depend on the angle at which the pipes are held on a pipe-lay barge when the plug material is poured into the annulus. Correction piece 110 is placed in the annulus oriented such that the face of the piece contacts the face of plug 104.

Although a large amount of water in annulus 36 may lead to a catastrophic failure because it may form an electrical short between inner pipe 34 and outer pipe 32, it is possible and prudent to design annulus 36 so that small amounts of water will not lead to a system short. Small amounts of water may be present in annulus 36 due to condensation of water vapor in annulus 36 or due to rain and seawater that may enter annulus 36 during the installation of pipe-in-pipe pipeline 10. The main concern with water arises in quads that do not lie horizontal. As shown in FIG. 3, in non-horizontal quads, any water present in annulus 36 will run down and collect on impermeable sea 108, where it can cause a short circuit across annulus 36. This problem is not normally present in horizontally oriented quads because water will spread along the bottom of annulus 36 for the entire length of pipe-in-pipe flowline 10 between two water stops and will not bridge from outer pipe 32 to inner pipe 34. In order to prevent the collected water from forming a short circuit in the non-horizontal portion of the pipeline, one or more electrically insulating collars shown in FIG. 3 as electrically insulating collars 112 and 114 may be formed on seal 108 to reduce pooling of water across annulus 36. Electrically insulating collars 112 and 114 allow a certain amount water to collect on either side or the collars without shorting the annulus. One collar may also be used. The preferred height of collars 112 and 114 is determined by the amount of water that may be in the annulus. Collars 112 and 114 are preferably made tall enough to allow several hundred grams of water to collect without causing a short circuit. A suggested height range is about 1.5 to 3 inches, although other heights may also be suitable. A two-collar arrangement such as shown in FIG. 3 can accommodate a packet of water absorption material, or "super absorbent pack" 116 between the collars. Super absorbent pack 116 may be placed on top of seal 108 and held within rubber collars 112 and 114, which may be integral with seal 106.

Super absorbent pack 116 traps water in the annulus and increases the amount of water that can be safely present in quads that are not horizontal. The use of super absorbent pack 116 can reduce the need for water-removal techniques, such as placing annulus 36 under vacuum between seals. Super absorbent pack 116 removes water (up to its capacity) from anywhere in the section of annulus 36 extending from impermeable seal 106 to the next impermeable seal above it. Super absorbent pack 116 may be Conned from polyacrylates or other known super absorbents.

In each water stop of this embodiment, the impermeable seal that would reside at the higher elevation if the quad were to be positioned at an angle from the horizontal may be i equipped with the same water management devices as impermeable seals 106 or 108, shown in FIG. 3. Each of these seals, like impermeable seals 106 and 108 may have two collars 112, 114 and a super absorbent pack 116. In addition, seals with the same water management devices as seals 106 and 108 may be installed in quads that do not contain a water stop. For these unsupported impermeable seals, the application of silicone grease to the outer surface of inner pipe 34 where the water seal sits is especially important to prevent the seals from rolling when the pipes move relative to each other.

A shallower-depth design shown in FIG. 4 may be employed in a selected part of riser 18 where water temperatures are higher and heat loss from the pipeline is less. This may include the upper-most quads of the riser section 18 (FIG. 1). FIG. 4 illustrates one embodiment of such apparatus in annulus 36. Insulating sleeve 62 (FIG. 3) is omitted to avoid overheating during electrical power input. In the embodiment shown in FIG. 4, centralizers 82 are used to provide electrical insulation and to centralize inner pipe 34 and outer pipe 32. Centralizers are most often cone-shaped wedges made of nonconductive materials. In one embodiment, centralizers may be composed of multiple parts such as described in U.S. Pat. No. 6,142,707. Centralizers 82 may be present at selected intervals in annulus 36 along the entire length. The spacing may vary depending upon local conditions, but typically is about 10–20 feet, except at locations containing water stops. The materials of construction for centralizers 82 are selected such that they are able to withstand the voltages present across the annulus and such that they do not char if arcing occurs. DELRIN and NYLON are preferred materials for voltages up to about 4000 volts. The outside surface of centralizers 82 may be beveled such that wet scale, possibly present in annulus 36, is unlikely to form an electrically conductive bridge between inner pipe 34 and outer pipe 32. Collar 84 may also be provided on the topside of the centralizers 82 to further block arcing resulting from any debris lying across the centralizers 82. inner pipe 34 may also be surrounded by electrically insulating layer ring 86. Insulating layer ring 86 provides electrical insulation in case contamination does establish a bridge spanning from inner pipe 34 to outer pipe 32. Insulating layer ring 86 may be a layer of solid polyurethane, approximately 0.25 inch thick. Coating 90 of fusion-bonded epoxy may be present on inner pipe 34.

During heating, the applied electric power required and the calculated heating rate may be based on the assumption that the heated segment is on the sea floor and that a hydrate plug is residing in inner pipe 34. However, the upper quads of riser section 18 will heat up faster because of higher water temperature. Furthermore, inner pipe 34 will also not likely contain a hydrates in shallower-depth section 54 because near sea level the ambient temperature and internal pressure are usually not in the range of pressure-temperature when hydrates form. Thus, the quads in shallower-depth section 54 may overheat while in heating mode. If annulus 36 in shallower-depth section 54 exceeds a critical temperature, electrically insulating materials may break down resulting in an electrical short in the upper quads of riser section 18, where the voltages across annulus 36 are highest. By omitting insulating sleeve 62 in shallower-depth segment 54. the inner pipe temperature rise may be limited to about 20° F., because of higher heat loss. Although thermal insulation is not required in shallower-depth section 54, electrical insulation and load sharing between inner pipe 34 and outer pipe 32 may be needed.

Figure 5:
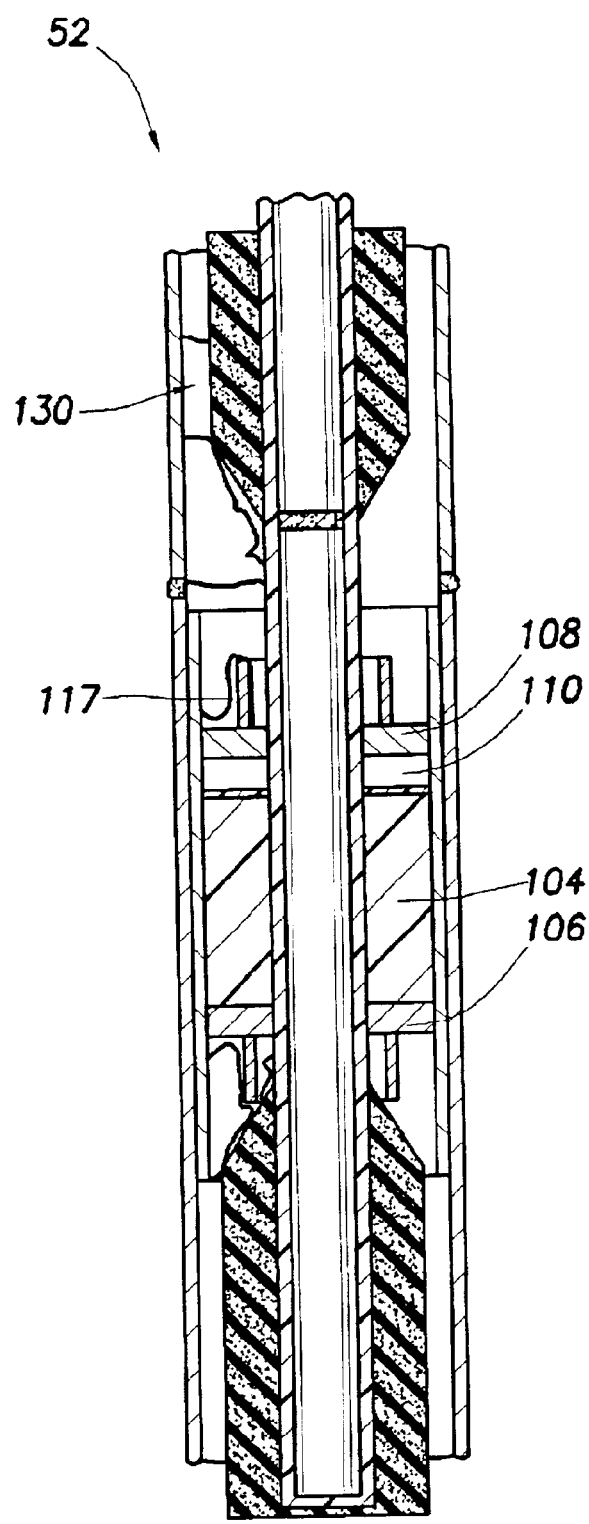
FIG. 5 is the cross sectional sketch of the pipe-in-pipe configuration with some possible arc paths in the annulus shown.

Arcing may occur in annulus 36. FIG. 5 shows possible breakdown paths 117 and 130. Water droplets distributed across an insulating surface can promote arcing. Materials should be selected such that water will flash off without substantially damaging the insulation when a high voltage is applied. Water may become trapped between plug 104 and angle-correcting piece 110 and between angle-correcting piece 110 and impermeable seal 108. Damage from arcing due to trapped water in the area between plug 104 and impermeable seal 108 may be reduced by selecting the construction material of angle-correcting piece 110. DELRIN and NYLON are preferred materials.

While particular embodiments of the present invention have been described, it is not intended that these details should be regarded as limitations on the present invention, except to the extent that they are included in the appended claims. It should be understood that various changes, substitutions and alterations can be made hereto without departing from the spirit and the scope of the invention as defined by the appended claims.

What is claimed is:

1. An apparatus for electrically isolating an inner pipe and an outer pipe, wherein the inner pipe is substantially concentric within the outer pipe, forming an annulus, the inner pipe having a plurality of weld joints and an outer surface and the outer pipe having an inner surface, comprising:

an electrically and thermally insulating ring, the insulating ring having an outside diameter surface, an inside diameter surface and a selected length along the annulus, the insulating ring disposed so as to concentrically surround the inner pipe within the annulus, and further disposed such that the inside diameter surface of the insulating ring abuts the outer surface of the inside pipe over the selected length, and further sized to provide a gap between the outside diameter surface of the insulating ring and the inner surface of the outer pipe.

2. The apparatus of claim 1, wherein the insulating ring is comprised of polyurethane foam.

3. The apparatus of claim 2 further comprising a solid skin, the solid skin forming the outer diameter surface of the insulating ring.

4. The apparatus of claim 3 wherein the solid skin is comprised of solid polyurethane.

5. The apparatus of claim 1 wherein the gap between the outside diameter surface of the insulating ring and the inner surface of the outer pipe is less than 0.25 inch.

6. The apparatus of claim 1 further comprising an electrically insulating coating on the outer surface of the inner pipe over a selected length along the annulus.

7. The apparatus of claim 6 wherein the electrically insulating coating is comprised of fusion bonded epoxy.

8. The apparatus of claim 6 wherein the thickness of the electrically insulating coating is greater than 20 thousandths of an inch.

9. The apparatus of claim 1 further comprising insulating half-shells disposed over a plurality of welds in the inside pipe.

10. The apparatus of claim 1 further comprising a plurality of water stops, the water stops being disposed at selected positions.

11. A water stop for limiting water flow in an annulus between an inner pipe and an outer pipe of an electrically heated pipeline having an axis in a pipe-in-pipe configuration, comprising:

an electrically insulating plug, the plug disposed such as to concentrically surround the inner pipe and fill the annulus over a selected length along the annulus, the plug having a first end face and a second end face;

a first electrically insulating seal, the first seal being in contact with the first end face of the plug and having a selected thickness and being disposed such as to concentrically surround the inner pipe and radially fill the annulus; and a second electrically insulating seal, the second seal having a first face and a second face and having a selected thickness and being disposed such as to concentrically surround the inner pipe and radially fill the annulus, the second face being in contact with the second end face of the plug.

12. The water stop of claim 11, wherein the plug is comprised of polyurethane.

13. The water stop of claim 11, wherein the first and second seal is comprised of a rubber.

14. The water stop of claim 13, wherein the rubber has a durometer in the range from about 40 to about 65.

15. The water stop of claim 13 wherein the rubber is SYLGARD.

16. The water stop of claim 11 further comprising a layer of fusion bonded epoxy disposed between the inner pipe and the plug.

17. The water stop of claim 11, wherein the selected length of the plug along the annulus is less than about 3 feet.

18. The water stop of claim 11 wherein the first face of the second seal supports at least one collar, the collar extending a selected distance from the first face.

19. The water stop of claim 11 further comprising a super absorbent disposed around the collar.

20. A water stop for limiting water flow in an annulus between an inner pipe and an outer pipe of an electrically heated pipeline having an axis in a pipe-in-pipe configuration, comprising:

an electrically insulating plug, the plug disposed such as to concentrically surround the inner pipe and fill the annulus over a selected length along the annulus, the plug having a first end face and a second end face, the first end face being perpendicular to the axis of the pipe-in-pipe configuration and the second end face being directed at a known non-perpendicular angle with respect to the axis of the pipe-in-pipe configuration;

a first electrically insulating seal, the first seal having a first face and a second face, the first face being in contact with the first end face of the plug and having a selected thickness and being disposed such as to concentrically surround the inner pipe and radially fill the annulus;

an electrically insulating angle-correcting piece sized to fit the annulus and having a first face perpendicular to the axis of the pipe-in-pipe configuration and a second face directed at the known non-perpendicular angle with respect to the axis of the pipe-in-pipe configuration, the second face of the angle-correcting piece being in contact with the second end face of the plug; and a second electrically insulating seal, the second seal being in contact with the first face of the angle-correcting piece and having a selected thickness and being disposed such as to concentrically surround the inner pipe and radially fill the annulus.

21. The apparatus of claim 20, wherein the plug is comprised of polyurethane.

22. The water stop of claim 20, wherein the first and second seal is comprised of a rubber.

23. The water stop of claim 20 further comprising a layer of fusion bonded epoxy disposed between the inner pipe and the plug.

24. The water stop of claim 20 wherein the angle-correcting piece is comprised of a char-resistant material.

25. The water stop of claim 20 wherein the first face of the second seal supports at least one collar, the collar extending a selected distance from the first face.

26. The water stop of claim 20 further comprising a super absorbent disposed around the collar.

27. The water stop of claim 20 wherein the second face of the first seal supports at least one collar, the collar extending a selected distance from the second face.

28. An apparatus for electrically isolating an inner pipe and an outer pipe, wherein the inner pipe is substantially concentric within the outer pipe, forming an annulus, the inner pipe having an outer surface and the outer pipe having an inner surface, comprising:

an electrically insulating centralizer, the centralizer extending radially from the inner pipe to the outer pipe and having a top surface, the top surface having a bevel so as to direct materials in the annulus toward the inner or the outer pipe; and a collar extending along the outer surface of the inner pipe from the top side of the centralizer.

29. The apparatus of claim 27 further comprises a cooler extending along the outer surface of the inner pipe from the top side of the centralizer.

30. The apparatus of claim 28 further comprising an electrically insulating layer ring extending along the outer surface of the inner pipe.

31. An electrically heated pipe-in-pipe subsea pipeline having an annulus between an inner pipe and an outer pipe, the pipeline having a seafloor segment and a riser segment, comprising:

a plurality of rings of electrically and thermally insulating material in the annulus, the rings being spaced at selected intervals and extending selected distances along the annulus to cover a selected fraction of the inner pipe, the selected fraction being less in the riser segment than in the seafloor segment.

32. The pipeline of claim 31 wherein the selected fraction is equal to or near zero for a selected distance along the riser segment.

* * * * *